July 12, 1927. Re. 16,679
J. C. BLACK ET AL
TREATMENT OF PETROLEUM PRODUCTS
Original Filed June 1, 1925
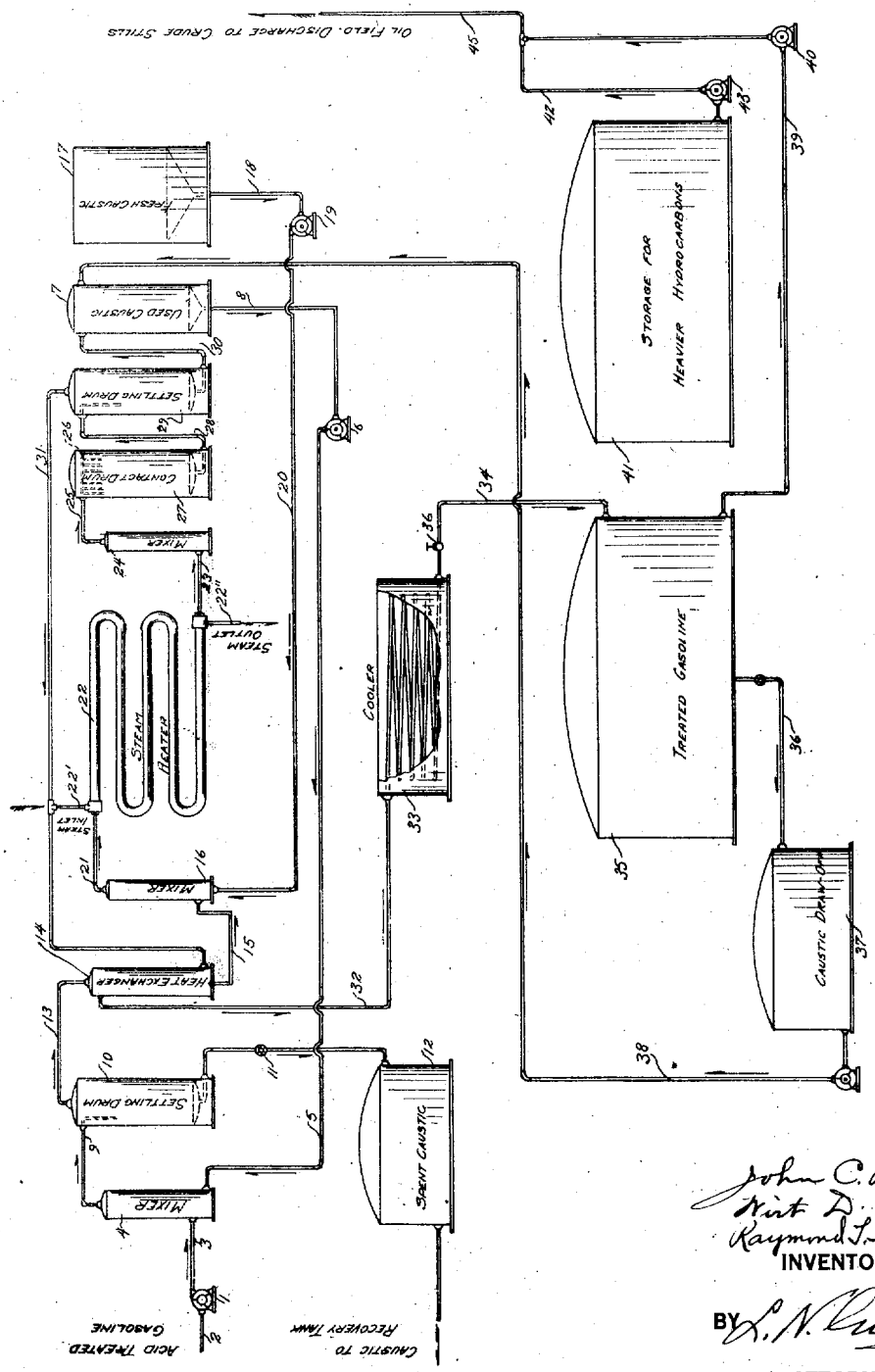
John C. Black
Kirt D. Rial
Raymond S. Moore
INVENTORS
BY L. N. Quillin
ATTORNEY Reissued July 12, 1927. Re. 16,679

UNITED STATES PATENT OFFICE.

JOHN C. BLACK, OF DESTREHAN, LOUISIANA, AND WIRT D. RIAL AND RAYMOND T. HOWES, OF LOS ANGELES COUNTY, CALIFORNIA, ASSIGNORS TO PAN AMERICAN PETROLEUM COMPANY, OF LOS ANGELES, CALIFORNIA, A CORPORATION OF CALIFORNIA.

TREATMENT OF PETROLEUM PRODUCTS.

Original No. 1,592,329, dated July 13, 1926, Serial No. 34,024, filed June 1, 1925. Application for reissue filed October 26, 1926. Serial No. 144,371.

Our invention relates to the treatment of hydrocarbons and particularly of petroleum products indicating a high sulfur content and other constituents that form undesirable substances or compounds, one of the chief purposes of our invention being to treat synthetic petroleum products with a view to removing all or the highest percentage of objectionable substances and one of the objects of our invention being to provide a method by which crude petroleum products may be economically treated for the purpose of refining the same.

Other objects will appear from the following specification in connection with the accompanying drawing which is illustrative of apparatus for carrying out the method and in which the view is an elevation, the various pieces of apparatus being shown in co-ordinated, connected relation in which they function to carry out the method either by batch or in continuous manner.

This invention relates chiefly to the treatment of the lighter hydrocarbon products of the petroleum group, comprehended in the term gasoline, whether of "straight" run, yielded by ordinary distillation methods, or of synthetic nature, produced by high temperature and pressure, and hence it will be understood that any cracked stock having the boiling points of gasoline, or the stock generally known as synthetic naphtha, or pressure distillate, is included in this disclosure and is within the spirit of the invention.

It is recognized that certain stocks or products of crude oil of the lighter grades contain sulfur compounds, and also constituents which form resins and resinous gums. This is particularly true of synthetic products falling within the boiling point range required for the stock known as gasoline and produced by high temperatures and pressure, or merely by high temperatures or by what is generally termed "cracking." The product resulting from the decomposition of petroleum oils by high temperature and pressure or by merely high temperatures in a crude gasoline, and is known in the art as crude synthetic gasoline, and this invention is directed chiefly to the treatment of this crude synthetic stock, though other hydrocarbons responding to the treatment are obviously included thereunder, such as crude naphtha or pressure distillate above referred to.

Since all synthetic and some natural stock contain sulfur and considerable gums and gum-forming and other undesirable constituents, it is the object of this invention to remove these compounds or substances, and produce from a distillate containing inferior products a finished gasoline marketable as a first grade product.

It is a recognized fact that certain gums and gum-forming compounds, especially the di-olefines, although reacting with sulfuric acid, are not removed by it, as the product of reaction is oil solubles. These compounds are objectionable in a motor fuel or lamp oil. We have also found that although sulfuric acid and other reagents remove some sulfur, there exists a point beyond which the removal of sulfur is no longer effectually removed by these agents.

To eliminate the gum and gum-forming constituents and to reduce the high sulfur contents of low boiling products and especially of a cracked or sour motor fuel, or lamp oil, to within the limits generally specified for marketable products and to produce a first grade fuel or lamp oil, we have discovered the present method, the details of which shall now appear, it being understood that changes in the practice of the process shall not be a departure from the spirit of the invention as expressed hereinafter.

We prefer to use for this process a crude synthetic naphtha, although a naphtha may be used that has a longer boiling point range, such as pressure distillate above referred to; the crude gasoline in this specification we wish to have understood as an unrefined distillate having the proper boiling points for finished gasoline and resulting from cracking or treatment by high temperature and pressure. This stock is usually treated with sulfuric acid, for purposes of removal of some of the undesirable compounds or constituents. While we prefer to start with said treated synthetic crude gasoline, we would have it understood that our process is not limited to that practice, and our invention consists generally in heating the crude synthetic naphtha with an alkaline solution, mixing the treated low boiling product with heavier hydrocarbons and then distilling the mixture, and specifically our invention consists of the steps set out hereinafter, in the sequence in which they occur in an apparatus of the type shown, in connection with which the invention will now be described.

Reference is made to the accompanying drawing which shows diagrammatically the apparatus which may be used for the process.

By means of a pump 1, crude synthetic naphtha, treated in the usual manner with acid, is delivered from pipe line 2 to pipe line 3 into a mixer 4, of ordinary baffled construction, and constituting substantially agitators. This mixer 4 is supplied with once-used, relatively weak alkaline solution, as caustic soda, through pipe line 5, by means of a pump 6, to which the used alkaline agent is supplied from a tank 7, through line 8. Alkaline solution, once used, as explained, is constantly supplied to the tank 7, as will appear presently. In the mixer 4, a partial neutralization of acid treated gasoline is effected under normal temperatures, that is, in the absence of any supplied heat, and such temperature may range from 70° F. to 90° F., or be of that degree resulting from storage conditions. Complete neutralization of a cracked stock, after heavy acid treatment, is extremely difficult in cold state, and hence the preliminary neutralization is resorted to to render the stock more sensitive and susceptible to the subsequent treatment, hereinafter detailed, and to reduce the acid content, (where such acid treatment precedes the present treatment), which requires further neutralization. Since the alkaline agent does act upon any product in the oil which reacts acid, it will be understood that the alkaline solution used herein is not confined to neutralizing acids, nor in fact, to the function of neutralization.

From the mixer 4, the mixture of the crude synthetic naphtha and alkaline solution is passed through pipe line 9, into a settling chamber 10, in which the caustic alkali settles out from the hydrocarbons and is drawn off through pipe 11, into a suitable tank 12.

The stock, being under a pressure above atmospheric and preferably of from 30 to 100 pounds, then passes through line 13, into a heat exchanger 14, of any known type, in which some of the heat of incoming treated hot gasoline, as explained hereinafter, is absorbed by the cold, crude synthetic naphtha, passing through the exchanger 14, in the exchanger 14, the temperature of the mixture is raised to approximately 150° F. and, leaving the exchanger 14, through pipe line 15, enters a mixer 16. This mixer 16, is supplied with a large excess of relatively strong alkaline solution from the supply tank 17, through line 18, pump 19, and line 20, and the fresh alkaline solution is intimately mixed with the naphtha. The mixture of naphtha and alkaline solution is then forced through pipe 21, into a steam or other heater 22, of any approved type, in which the mixture is further raised to a temperature which will produce the best results from and on the particular distillate undergoing treatment. The heater 22 is supplied through pipe 22′ with a heating medium, which is drawn off through pipe 22″.

In our experience, and for the most beneficial effect and advantageous results, we have found that the temperature to which the mixture, to wit, the synthetic naphtha and caustic is subjected should preferably not exceed 350° F. The temperature used is maintained on the mixture for a period of time which will enable the alkaline solution to work uniformly and effectively upon the naphtha, in its heated condition, and thereby effect a thorough and complete neutralization of the stock where it has been first acid treated. We consider this hot alkaline treatment of the utmost importance in obtaining the satisfactory results which our experience proves, in removing undesirable compounds and especially sulfur and objectionable sulfur combinations from the synthetic crude naphtha, whether priorly acid treated or not. We find also that this hot alkaline action upon the synthetic crude naphtha operates to eliminate some of the gum-forming constituents and to affect other gum-forming constituents in a manner to render them readily removable or extractable by any available means, as explained later. We would here have it understood again that this hot alkaline solution used herein is not limited to merely working a neutralization of an acid treated stock, but performs the other functions mentioned above.

In order to insure the most thorough neutralization of an acid treated stock and to reduce to a minimum the sulfur and sulfur combinations, and also the gums and gum-forming constituents prevalent in a cracked stock, we pass the mixture through pipe 23 into a mixer 24, and from the mixer 24, convey the mixture through pipe 25, through an injector 26 disposed in the top of a drum or tank 27. By injection of the mixture in the drum 27, the contact of the hot alkaline solution with the hot gasoline is as nearly perfect as possible, with the result that the majority of the sulfur and nearly all of the gums and gum-forming constituents are broken down and are hence readily removable from the product as will appear later.

It will be observed that the mixture of naphtha and alkaline solution, in order to have the best effect, must be kept in a state of continuous agitation, and this agitation is afforded by the various mixers 4, 16 and 24, which in fact are agitators.

From the bottom of the contact chamber or drum 27, the mixture is forced through pipe 28, into a settling drum 29, in which the major separation of the alkaline agent occurs from the synthetic hydrocarbons, sufficient pressure being maintained as stated, within the drum and throughout the system to prevent vaporization or any substantial vaporization of the heated synthetic hydrocarbons and to execute the process in the liquid phase. The heavier portions of the mixture settle on the bottom of, and are forced out from the tank 29, through pipe 30, into the used alkaline solution storage tank 7, while the lighter portion, which includes a mixture of gasoline and a small percentage of the alkaline agent, is forced out of the drum 29, through pipe line 31, into the bottom of the heat exchanger 14, and from the top of the heat exchanger 14, through line 32, into a cooler 33. From the cooler 33, the mixture is forced through pipe line 34, into a tank 35, a valve 36 being provided on the pipe 34, to regulate the pressure on the system, including the cooler 33, for the purpose of preventing vaporization. From the tank 35, whatever small quantity of the heavier solution remains and precipitates may be drained off through valved pipe 36, to tank 37, from which the solution may be returned through line 38, to the used alkali tank 7, for reuse, as explained at the outset.

The treatment thus far described, of the crude synthetic naphtha with the caustic alkaline solution, under the temperature condition named, to wit, not exceeding 350° F., and under a pressure above atmospheric and sufficient to prevent vaporization or substantial vaporization, yields a product of straw color and good odor, but with the sulfur content not diminished to a satisfactory low percentage. We have found also that this hot treatment of crude synthetic naphtha breaks down the gum-forming or resinous constituents, which are either held in solution or are cast down after a period of time, as a viscous precipitate, without however removing them. To reduce the sulfur content to the lowest possible minimum, and render the treated stock gum free, we mix the treated gasoline with heavier hydrocarbons, preferably, though not necessarily, containing a percentage of gasoline and then subject the mixture to the process of ordinary distillation. These heavier hydrocarbons, which include the crude petroleums, act as a solvent for the natural gums and altered gums resulting from the hot caustic or other alkaline treatment. For the purpose of effecting a thorough mixture, the treated gasoline is drawn from the tank 35, through pipe line 39, by pump 40, and the heavier hydrocarbons are drawn from the tank 41 through pipe line 42 by pump 43, the pipes 39 and 42 being conjoined at A and the two fluids thus mixed forced through line 45 to a still not shown.

We find that by the subsequent distillation of the mixture, the sulfur content of the resulting product is much lower than is the case where the separate stocks, to wit, the crude synthetic naphtha and the straight-run gasoline are separably produced and then mixed together.

We find also that the distillate resulting from the distillation of the mixture is substantially free from gum and gum-forming constituents which, as explained are extracted by the heavier hydrocarbons, upon distillation with it, after having been rendered extractable by the process as outlined.

The distillate obtained, we have found, requires no other treatment than that usually applied to the straight-run stock, and we have found that the straight-run or natural gasoline in the crude oil (if crude oil were used as the solvent), is much improved by the mixture and subsequent distillation.

A specific example of results obtained by our process as above described and as being actually practiced by us follows:

The crude synthetic naphtha, having a sulfur content of 1.10%, was first acid treated in the usual manner. The acid treated stock was then subjected to treatment with a caustic soda solution according to the method as disclosed in this specification, reducing the sulfur content to 0.84%.

This treated synthetic naphtha was mixed with a crude oil of known gasoline content in such percentage that the resulting combined gasoline produced by subsequent distillation was composed of 77.7% straight run gasoline and 22.3% synthetic gasoline by volume. The sulfur content of the finished gasoline was 0.07% and it was practically free from gummy residues.

On the other hand, a mechanical mixture (in the same proportions as above) consisting of the treated synthetic naphtha and the straight run gasoline distilled from the crude independently, finishes with a sulfur content of 0.22% and is otherwise an undesirable product, containing a considerable amount of gummy residue.

What we claim, is:

1. The process of purifying acid treated synthetic or cracked petroleum products having the boiling points of gasoline which consists in treating the products with a relatively weak alkaline solution to partially neutralize the products; in removing the weak alkaline solution; in mixing with the products thus treated a relatively strong alkaline solution and subjecting the mixture to a temperature not exceeding 350° F. while preventing substantial vaporization of the products, to cause the relatively strong alkaline solution to break down gums and gum forming bodies, in cooling the mixture, in separating the alkaline solution; in mixing the products with a heavier hydrocarbon, and in then distilling the mixture to remove the gum and gum forming bodies.

2. The process of purifying acid treated synthetic or cracked petroleum products having the boiling point of gasoline, which consists in treating the products with a relatively weak alkaline solution in the absence of any supplied heat to partially neutralize the acid-treated product; in separating the relatively weak alkaline solution from the products; in mixing with the products a relatively strong alkaline solution; in subjecting the mixture to a temperature not exceeding 350° F. and to continuous agitation to cause the relatively strong alkaline solution to break down the gums and gum-forming constituent, in maintaining a pressure upon the mixture to prevent substantial vaporization, in separating the alkaline solution from the products, in mixing with the products a hydrocarbon heavier than the product treated, and in distilling the mixture to effect the removal of the gums and gum-forming bodies.

3. The process of purifying unrefined acid treated distillates having the proper boiling points for gasoline and resulting from cracking, which consists in effecting a partial neutralization of the acid treated distillates with a relatively weak alkaline solution, in the absence of any supplied heat; separating from the distillates the alkaline solution, then mixing with distillates a relatively strong alkaline solution and subjecting the mixture to a temperature not exceeding 350° F. and agitating the mixture to break down the gums and gum-forming constituents in the distillates, in separating the relatively strong alkaline solution from the distillates, cooling the distillates, mixing with the distillates a crude oil containing a known percentage of gasoline, and then distilling the mixture to cause the crude oil to remove from the distillates the gums and gum-forming products broken down by the relatively strong hot alkaline solution.

4. The process of purifying acid treated products resulting from cracking which consists in mixing with the products a weak alkaline solution and agitating the mixture to effect a partial neutralization of the acid treated products in the absence of any supplied heat; in separating the relatively weak alkaline solution; in mixing the partially neutralized products with a relatively strong alkali and subjecting the mixture to a temperature not exceeding 350° F. and to constant agitation to break down gums and gum-forming constituents, while preventing substantial vaporization; in separating the relatively strong alkali from the products; in cooling products; in mixing the products thus treated with crude oil having a percentage of gasoline, and in then distilling the mixture to cause the crude oil to remove from the treated products, the gums and gum-forming constituents.

5. The process of purifying acid treated synthetic petroleum products having the boiling point of gasoline, which consists in partially neutralizing the acid treated products and separating the neutralizing agent from the products; in breaking down the gums and gum-forming constituents in the petroleum products by a strong alkali under a temperature not exceeding 350° F.; in separating the alkali and the reaction products from the petroleum products; and then removing the gums and gum-forming constituents by mixing the products thus treated with crude oil and distilling the mixture whereby the gums are absorbed by the crude oil.

6. A process of removing gum-forming constituents from cracked gasoline which comprises heating a mixture of said gasoline and alkali solution to an elevated temperature and pressure and for a period of time sufficient to convert said gum-forming constituents and further purifying the thus treated gasoline by distillation to obtain a gasoline substantially free of gum-forming constituents.

7. A process of removing gum-forming constituents from cracked gasoline which comprises heating a mixture of said gasoline and alkali solution to an elevated temperature and pressure and for a period of time sufficient to convert said gum-forming constituents, separating the alkali solution from the gasoline and further purifying the thus treated gasoline by distillation to obtain a gasoline substantially free of gum-forming constituents.

8. A process of removing gum-forming constituents from cracked gasoline which comprises acid treating said gasoline, neutralizing the acid treated gasoline, heating a mixture of said neutralized gasoline and alkali solution under pressure to an elevated temperature and pressure and for a period of time sufficient to cause a conversion of said gum-forming constituents, separating the alkali solutions from the gasoline and further purifying the separated gasoline by distillation to obtain a gasoline substantially free of the gum-forming constituents.

In testimony whereof we have set our hands.

JOHN C. BLACK.
WIRT D. RIAL.
RAYMOND T. HOWES.